Feb. 23, 1960
P. H. H. HOOKINGS ET AL
2,926,028
FLEXIBLE PIPE COUPLING
Filed July 11, 1955
2 Sheets-Sheet 1
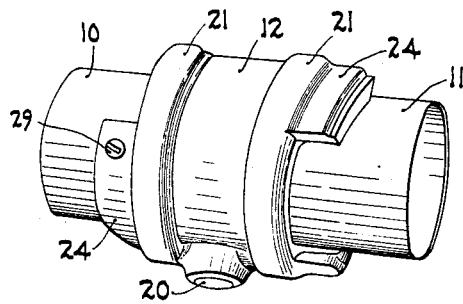
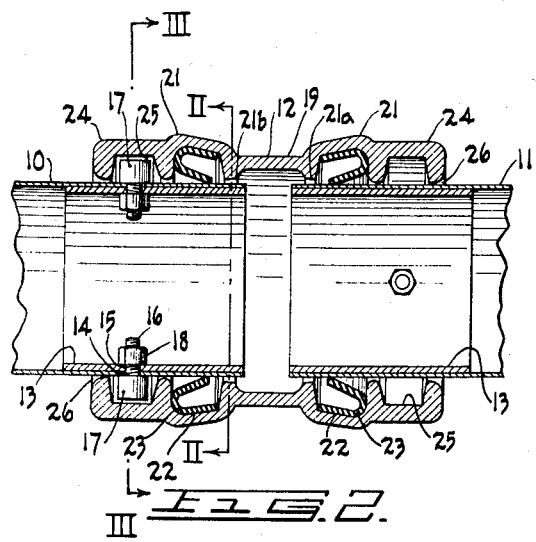
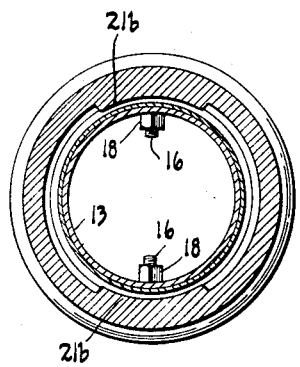
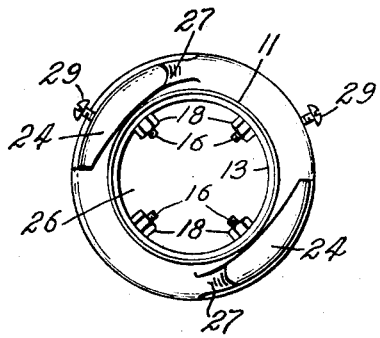
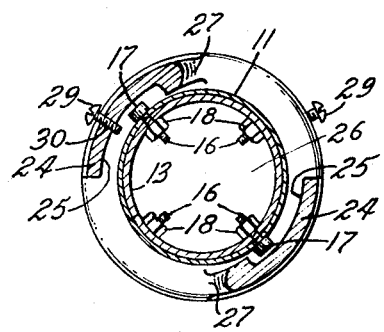
Inventors
Paul H. H. Hookings
James S. Thom
By
Bailey Stephens and Huetig
Attorneys Feb. 23, 1960

P. H. H. HOOKINGS ET AL 2,926,028

FLEXIBLE PIPE COUPLING

Filed July 11, 1955

Inventors
Paul H.H. Hookings
James S. Thom
By
Bailey Stephens and Huettig
Attorneys

United States Patent Office 2,926,028
Patented Feb. 23, 1960

2,926,028

FLEXIBLE PIPE COUPLING

Paul H. H. Hookings and James Sutherland Thom, Vancouver, British Columbia, Canada, assignors to Major Aluminum Products Ltd., Vancouver, British Columbia, Canada, a Canadian company Application July 11, 1955, Serial No. 521,105

Claims priority, application Canada January 20, 1955

6 Claims. (Cl. 285—90)

This invention relates to a pipe coupling and more particularly to an improved pipe coupling of the type in which provision is made for flexibility between the pipes and the coupling.

The general objects of this invention are to provide an improved coupling which can be quickly assembled, in which the pipes and coupling are positively locked together and which has increased flexibility.

Further objects and advantages and the manner in which the foregoing objects are achieved in accordance with this invention will be apparent from the detailed description which follows of the preferred embodiment of this invention and from the appended claims.

In the drawings which illustrate the preferred embodiments of this invention:

Figure 1 is a perspective view of a coupling in accordance with this invention,

Figure 2 is a sectional elevation view of the coupling shown in Figure 1,

Figure 3 is an end view of the coupling shown in Figures 1 and 2,

Figure 3a is an end section view on the line III—III of Figure 2,

Figure 4 is an end section view on the line II—II of Figure 2,

Figure 5:
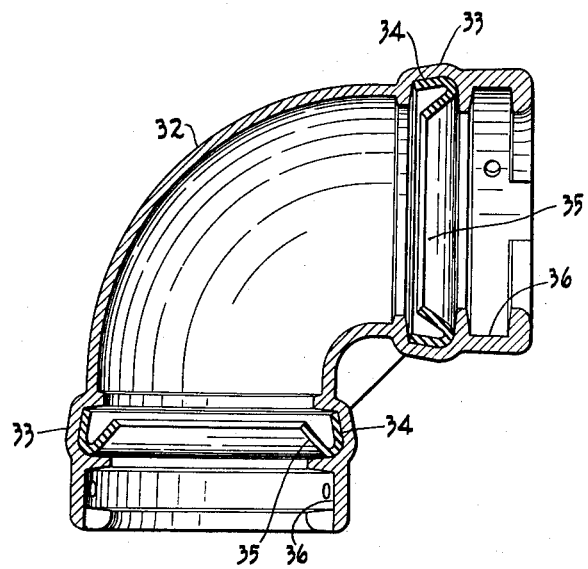
Figure 5 is a sectional side elevation view of another embodiment of this invention.

Referring to Figures 1, 2 and 3 of the drawings, pipes 10 and 11 positioned axial alignment are shown coupled together by a coupling having a main housing 12. Each of pipes 10 and 11 has an interior reinforcing sleeve 13 at the end which is inserted in the coupling. Aligned radial apertures 14 and 15 are formed in the pipe and reinforcing sleeve respectively to receive threaded portions 16 which are preferably integrally formed with lugs 17. A pair of lugs 17 extend radially outwardly and are oppositely disposed on the surfaces of each of pipes 10 and 11 to provide pivotal axes for relative movement of the pipes and couplings. Lugs 17 are mounted on the pipes by threaded portions 16 which are engaged by nuts 18. The axes formed by the lugs 17 on pipes 10 and 11 respectively are arranged so that the axes will be transverse to each other thus providing universal flexibility for the coupling. The axes of the lugs 17 on each individual pipe are preferably parallel.

The housing 12 has a central tubular portion 19 in which there may, if desired, be formed a tapped outlet adapter 20. Shoulders 21 are provided at each end of tubular portion 19. Abutment shoulders 21a and 21b are provided to limit the angle of flexible movement of the pipes without damage to the edges of the pipes. The abutment shoulders extend around the internal periphery of the housing and are shaped to provide maximum flexibility about the axes of the lugs and minimum flexibility about the axis at right angles to the axis of the lugs and to the longitudinal axis of the pipes. This can be achieved by making the part of the abutment shoulder which is in axial alignment with at least the central part of the grooves (described below) for receiving lugs 17, higher than the remainder of the abutment shoulder as illustrated in Figures 2 and 4. The foregoing structure minimizes loading stresses on the lugs should the joint be sprung in a direction lying in a plane passing through the axis of the lugs and the principal axis of the pipe. Figure 4 is a sectional view showing one of the abutment shoulders 21a in relation to its adjacent lugs 17 when lugs 17 are in a central position. The abutment shoulder is illustrated as having a discontinuity between its higher and lower portions. Interior annular recesses 22 are formed within shoulders 21 to receive V-shaped sealing gaskets 23 which provide a seal between the pipe and the housing against outward pressure while permitting flexibility between the pipes and the housing. Shoulders 21 also have extensions 24 to define at each end of the coupling inwardly directed arcuate grooves 25 which are for engaging lugs 17. The grooves are oppositely located on each side of the pipe receiving apertures 26. Each of the grooves is closed at one end by an abutment 27 which in the embodiment illustrated is an integral part of shoulder extension 24 to limit the movement of the lugs in one direction. The other end of each of the grooves is open so that the pipe can be rotated in the other direction to disengage the lugs from the grooves. Abutments can conveniently be provided in both grooves of each pair but only the abutment in one of these grooves is necessary.

A locking means is provided in one of the grooves 25 of each pair of grooves consisting of a bolt 29 engaging radially directed threaded hole 30. When bolt 29 is tightened it blocks groove 25 thus preventing the lug 17 received by groove 25 from being disengaged. When bolt 29 is loosened the lug can readily be disengaged from the groove. The positive locking thereby provided is particularly advantageous when the coupling is used for an airline coupler as the high pressures involved make the conventional quick locking couplers unsafe. The locking means 29 is spaced from abutment 27 so that the pipes can be rotated to a limited extent with the lugs remaining within the grooves. Preferably the locking means is spaced from the abutment by at least a right angle. One advantage of this is that where it is desired to incline the pipes relatively to each other at an angle which is in excess of that which would be possible with the pairs of lugs arranged at right angles to each other, the possible angle of flexible movement can be increased by adjusting the positions of the lugs in the grooves so that the axes defined by the pair of lugs are at an acute angle to or parallel to each other, thus taking advantage of the additive flexibility of each pipe with respect to the coupling. Another advantage is that where there are several pipe couplings joining a series of sections of pipe, an intermediate pipe section can readily be rotated to disengage one of the couplings. The locking means need not be spaced from an abutment in the same groove. It will be apparent that in one position the axis formed by one pair of lugs combines with the axis formed by the pair of lugs at the other end of the coupling to give universal flexibility. Where however provision is made for rotation of the axes through 45° from a position in which the axes are at right angles to each other another position is provided in which the axes can be placed parallel to each other to make maximum bending or biasing movement possible. If the axes can be adjusted 45° in each direction from their position at right angles to each other to give a total possible movement of 90° for each axis, the axes can be oriented in parallel for combined universal flexibility.

Figure 6:
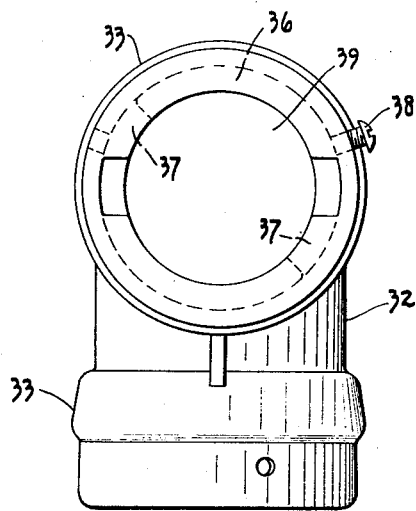
Figure 6 is an end elevation in Figure 5.

The embodiment shown in Figures 5 and 6 is similar in structure to the embodiment illustrated in Figures 1 to 3 exclusive except that in Figures 5 and 6 the principles of this invention are shown applied to an elbow coupling for joining pipes which are at an angle to each other. In Figures 5 and 6 the housing comprises a curved tubular portion 32 having shoulders 33 at each end. Shoulders 33 each contain an annular recess 34 to receive V-shaped sealing gaskets 35 and arcuate lug engaging grooves 36. Grooves 36 are each closed off at one end to provide abutment 37 and a locking bolt 38 is provided to block when tightened the other end of one of each pair of opposed grooves. It is particularly advantageous in the case of an elbow coupling for abutment 37 and locking bolt 38 to be spaced an angular distance of at least a right angle as subtended at the centre of pipe receiving aperture 39. This enables the axis of biasing movement of the pipe which is inserted in the coupling to be adjusted for movement of the pipe in any desired direction. Accordingly universal movement is provided even in an elbow coupling combined with positive locking.

Pipe couplings in accordance with this invention are primarily designed for use as air line couplers and are particularly suitable for this purpose. They are preferably made from aluminum alloy. However the couplings can be used for other purposes particularly where the requirements are quick coupling, positive locking and flexibility at the joints formed by the coupling. Other appropriate materials can also be used in their construction.

We claim:

1. A pipe coupling comprising a housing apertured to receive an end of each of a pair of pipes, each of said ends having a pair of oppositely disposed lugs extending radially outwardly from the surface of the pipe, means defining a pair of oppositely disposed arcuately extending grooves at each of the apertured portions of the housing, said grooves facing inwardly towards the outer surface of the pipe received in the respective aperture and being adapted to receive the lugs extending from the last mentioned pipe, said lugs having a dimension in the longitudinal direction of the joint substantially equal to the width of the grooves and being pivotable in the grooves, abutment means closing off one end of at least one of the grooves of each pair to limit the movement of the lugs upon rotation of the last mentioned pipe about its longitudinal axis in one direction, the other end of each of the grooves being open to permit disengagement of the lugs from the grooves by rotation of the pipe in a direction opposite to said one direction, locking means adjacent to said other end of at least one of the grooves of each pair of oppositely disposed grooves adapted to be adjusted to permit or prevent said disengagement of the lugs from the grooves, said locking means extending inwardly from the groove forming means and terminating at a point spaced outwardly from the outer surface of the pipe, each of said pipes being capable of limited biasing movement with respect to the housing about axes passing through each of the oppositely disposed pairs of lugs and sealing means for preventing leakage between the pipes and the housing, the space between the locking means and the abutment forming an angle at least about 45° around the axis of the coupling, the grooves at one apertured portion of the housing being located in substantially two opposed quadrants of a cylinder having the axis of the coupling as its center and the grooves at the other apertured portion of the coupling being located substantially within the other two opposed quadrants of said cylinder, whereby to permit said lugs to be rotated without disengagement between a position in which the lugs at each end of the housing are parallel to each other for additive flexibility and a position in which the lugs at each end of the housing are perpendicular to each other for universal flexibility.

2. A pipe coupling as in claim 1 in which the apertures face at right angles to each other to form an elbow and in which, in each groove having an abutment means and locking means, said abutment means and locking means are angularly spaced by at least 90° subtended at the centre of the respective aperture to permit the axis formed by each pair of lugs to be adjusted for limited biasing movement with respect to the housing in any given direction.

3. A pipe coupling as in claim 1 in which the locking means comprises a bolt radially directed with reference to its respective aperture and extending when tightened into a groove.

4. The combination of a pair of pipes, each of said pipes having a pair of oppositely disposed lugs extending radially outwardly from the surface of the pipe at an end thereof and a coupling comprising a housing apertured to receive said ends, said coupling having means defining a pair of oppositely disposed arcuately extending grooves at each of the apertured portions of the housing, said grooves facing inwardly toward the outer surface of the pipe received in the respective aperture and being adapted to receive the lugs extending from the last mentioned pipe, said lugs having a dimension in the longitudinal direction of the joint substantially equal to the width of the grooves and being pivotable in the grooves, abutment means closing off one end of each of the grooves to limit the movement of the lugs upon rotation of the last mentioned pipe in one direction, the other end of each of the grooves being open to permit disengagement of the lugs from the grooves by rotation of the pipe in a direction opposite to said one direction, locking means adjacent to said other end of at least one of the grooves of each pair of oppositely disposed grooves adapted to be adjusted to permit or prevent disengagement of the lugs from the grooves, said locking means extending inwardly from the groove forming means and terminating at a point spaced outwardly from the outer surface of the pipe between a position in which the lugs at each end of the housing are parallel to each other for additive flexibility and a position in which the lugs at each end of the housing are perpendicular to each other for universal flexibility, each of said pipes being capable of limited biasing movement with respect to the housing about axes passing through each of the oppositely disposed pairs of lugs and sealing means for preventing leakage between the pipes and the housing, the space between the locking means and the abutment forming an angle of at least about 45° around the axis of the coupling, the grooves at one apertured portion of the housing being located in substantially two opposed quadrants of a cylinder having the axis of the coupling as its center and the grooves at the other apertured portion of the coupling being located substantially within the other two opposed quadrants of said cylinder, whereby to permit said lugs to be rotated without disengagement between a position in which the lugs at each end of the housing are parallel to each other for additive flexibility and a position in which the lugs at each end of the housing are perpendicular to each other for universal flexibility.

5. A combination as in claim 4 in which each of the pipes has an internal reinforcing sleeve at the end thereof and in which the lugs at that end are secured to the pipe by means passing through registering apertures in the pipe and reinforcing sleeve respectively.

6. The combination of a pair of pipes, each of said pipes having a pair of oppositely disposed lugs extending radially outwardly from the surface of the pipe at an end thereof and a coupling comprising a housing apertured to receive said ends, said coupling having means defining a pair of oppositely disposed arcuately extending grooves at each of the apertured portions of the housing, said grooves facing inwardly toward the outer surface of the pipe received in the respective aperture and being adapted to receive the lugs extending from the last mentioned pipe, said lugs having a dimension in the longitudinal direction of the joint substantially equal to the width of the grooves and being pivotable in the grooves, abutment means closing off one end of each of the grooves to limit the movement of the lugs upon rotation of the last mentioned pipe in one direction, the other end of each of the grooves being open to permit disengagement of the lugs from the grooves by rotation of the pipe in a direction opposite to said one direction, locking means adjacent to said other end of at least one of the grooves of each pair of oppositely disposed grooves adapted to be adjusted to permit or prevent disengagement of the lugs from the grooves, said locking means extending inwardly from the groove forming means and terminating at a point spaced outwardly from the outer surface of the pipe between a position in which the lugs at each end of the housing are parallel to each other for additive flexibility and a position in which the lugs at each end of the housing are perpendicular to each other for universal flexibility, each of said pipes being capable of limited biasing movement with respect to the housing about axes passing through each of the oppositely disposed pairs of lugs, abutment shoulders peripherally extending around the interior surface of said housing and having a high portion of each shoulder in axial alignment with the portion of the adjacent groove between its abutment means and locking means and a low portion of each shoulder between said high portions to permit biasing movement about said axes passing through each of the oppositely disposed pairs of lugs while preventing substantial biasing movement about the respective axes perpendicular to the last mentioned axes and to the longitudinal axes of the pipes, and sealing means for preventing leakage between the pipes and the housing, the space between the locking means and the abutment forming an angle of at least about 45° around the axis of the coupling, the grooves at one apertured portion of the housing being located in substantially two opposed quadrants of a cylinder having the axis of the coupling as its center and the grooves at the other apertured portion of the coupling being located substantially within the other two opposed equadrants of said cylinder, whereby to permit said lugs to be rotated without disengagement between a position in which the lugs at each end of the housing are parallel to each other for additive flexibility and a position in which the lugs at each end of the housing are perpendicular to each other for universal flexibility.

References Cited in the file of this patent

UNITED STATES PATENTS

| | | |
|---|---|---|
| 621,282 | Pugh | Mar. 14, 1899 |
| 864,299 | Halley | Aug. 27, 1907 |
| 1,073,017 | Bailey | Sept. 9, 1913 |
| 1,490,771 | Fortin | Apr. 15, 1924 |
| 1,620,094 | Gillick | Mar. 8, 1927 |
| 2,127,124 | Litner | Aug. 16, 1938 |
| 2,199,939 | Knoerzer | May 7, 1940 |
| 2,241,771 | Ell | May 13, 1941 |
| 2,465,708 | Chapin | Mar. 29, 1949 |
| 2,494,855 | Anderson | Jan. 17, 1950 |
| 2,534,723 | Meese | Dec. 19, 1950 |
| 2,589,321 | Anderson | Mar. 18, 1952 |
| 2,643,138 | Jacobs | June 23, 1953 |